July 16, 1968  S. R. GALLER  3,392,575
THERMAL PANEL FOR DETERMINING THE EFFECTS OF VARIOUS
TEMPERATURES ON FOULING ORGANISMS
Filed Oct. 21, 1965

INVENTOR
SIDNEY R. GALLER

BY *Melvin L Crane* AGENT
*R S Sciascia* ATTORNEY

United States Patent Office 3,392,575
Patented July 16, 1968

3,392,575
THERMAL PANEL FOR DETERMINING THE EFFECTS OF VARIOUS TEMPERATURES ON FOULING ORGANISMS
Sidney R. Galler, 6242 Woodcrest Ave., Baltimore, Md. 21209
Filed Oct. 21, 1965, Ser. No. 500,449
10 Claims. (Cl. 73—61.2)

ABSTRACT OF THE DISCLOSURE

This disclosure is directed to a system of electrically heated plates for determining the growth of barnacles and other marine organisms on marine structures. Each of the plates are maintained at a different temperature and a record of the temperature is recorded while the plates are inspected periodically to determine the state of growth on each of the different plates.

---

The invention described herein may be manufactured and used by or for the Government of the United States of America for governmental purposes without the payment of any royalties thereon or therefor.

The present invention relates to inhibiting the growth of barnacles and any other marine organisms on marine structures, more particularly to a method for determining the growth of and for controlling the attachment and growth of marine animals and plants or any other marine organisms onto a surface under differing environmental conditions.

Heretofore, various methods of evaluating fouling by barnacles or animal life in the water has been carried out by use of wooden transite panels, surfaces such as glass, wood, mild steel, and porcelain coated panels which have been placed into the water and checked periodically. This method merely establishes the kind of fouling growth which exists in an area, and determines the extent of the growth over a period of time. This method does nothing to determine the best way of preventing the attachment and growth of organisms in any given locality except as to the extent of the amount of growth attachment on the particular material used.

The device is formed with a plurality of panels, each of which is provided with one or more heating elements to heat the panel to a specific temperature or with sections thereof at different temperatures. The device may be arranged so that each panel is in a radial direction from the axis wherein each panel is provided with a single heating element. One of the panels will be at ambient temperature and each panel in order, clockwise or counterclockwise, will be raised to a higher temperature so that each of the panels will have a different temperature thereon. Each panel is also provided with a temperature-detecting device which detects the temperature at which the panel is maintained and the temperature reading is recorded on a timed graphic chart by a pin-recorder or by any other suitable recorder.

The device may be made with fewer radially arranged panels wherein each of the panels are divided into subpanels in which each of the subpanels have heating elements of different value that will divide each panel into areas each with a different temperature thereon. Each subpanel will then be held at a different temperature and each subpanel will also be provided with a temperature detector device in which the temperature will be recorded on a separate recorder for each subpanel. Thus, a recording of the temperature of each subpanel is kept as a permanent record wherein the temperature readout record enables one to monitor and compare the rate and/or type of fouling on each different panel or each different subpanel as the case may be. Such an arrangement of thermal panels enables one to not only monitor the kind and type of fouling in an area, but also simultaneously to determine the temperatures most likely to prevent or control fouling growth.

It is therefore an object of the present invention to provide a practical, economic, and time-saving means for determining the optimum temperatures for controlling the attachment and growth of marine animals and plants onto a surface under differing environmental conditions.

Another object is to provide a simple compact means by which information on growth of marine animals and plants may be obtained.

Still another object is to provide a system through which one may determine the temperature most likely to prevent or control fouling growth on a piece of metal.

While still another object is to provide a self-maintained system which does not require constant operation thereof by an individual.

The nature of this invention as well as other objects and advantage thereof will be readily apparent from consideration of the following specification relating to the annexed drawings, in which.

Figure 1:
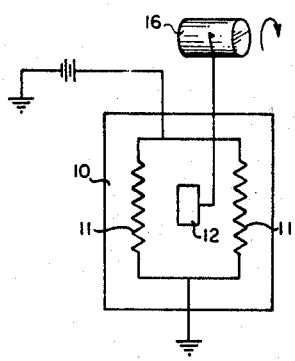
FIG. 1 represents a single plate having heating elements therein to maintain the single plate at a particular temperature with a single temperature detector device secured thereon.
Figure 2:
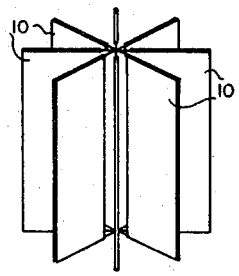
FIG. 2 represents an assembly formed of a plurality of plates such as shown in FIG. 1.

Now, referring to the drawings wherein the same reference characters represent like parts throughout the drawings, there is shown in FIG. 1 a single plate 10 comprising a heating element 11 and a temperature readout detecting element 12. A plate, such as shown in FIG. 1, may be made with different resistance values to provide a different temperature in each panel such that an assembly such as shown in FIG. 2 may be made with the panels extending radially away from the axis of the assembly. The heating element of each panel may be calibrated to maintain a distinct temperature of a difference of five degrees, more or less, such that when the panels are assembled in an assembly such as shown in FIG. 2, each adjacent panel will have a temperature difference of five degrees more or less, going around the plurality of plates either clockwise or counterclockwise. In the assembly, the first plate is not provided with a heating element 11 or no current is applied thereto such that the first plate will be at ambient temperature. However, the plate is provided with a temperature detecting device such that the temperature detecting device will provide a temperature readout of ambient temperature. The plates in order clockwise will increase by a temperature of five degrees, more or less, such that different temperatures will be applied to each of the successive plurality of plates. The heating elements and recorders are the same as shown in FIG. 1 and are not shown for simplification of the drawings.

Figure 3:
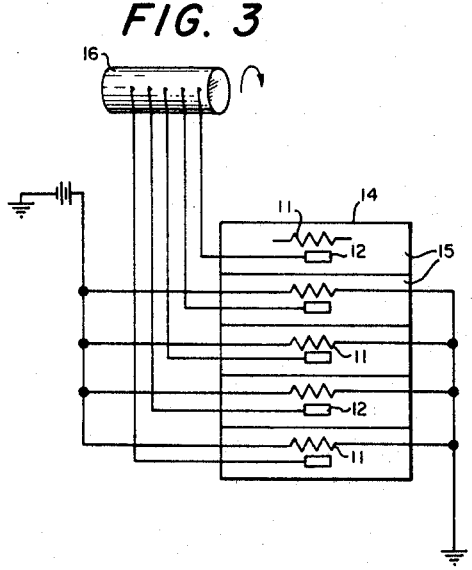
FIG. 3 illustrates a single plate made with a plurality of subpanels, each of which has heating elements and heat temperature detecting devices thereon.
Figure 4:
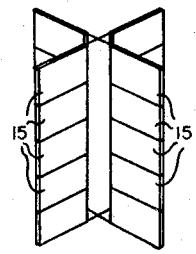
FIG. 4 represents an assembly of a plurality of plates made of a single plate such as shown in FIG. 3.

In order to obtain the same information with fewer plates than as shown in FIG. 2, each plate 14 may be divided into a plurality of subpanels 15. As shown in FIG. 3, the upper subpanel will be at ambient temperature since the electrical source is not connected thereto with each subpanel away from the top toward the bottom having a heating element which will maintain each successive subpanel at a temperature of at least five degrees higher than the subpanel immediately above it. Each subpanel is provided with a temperature detecting device 12 in which the temperature is recorded by a temperature readout device 16, one for each of the temperature-detecting devices on each of the subpanels. A plurality of panels such as shown in FIG. 3 may be arranged into a grid such as shown in FIG. 4. In the assembly as shown in FIG. 4, one subpanel at the top is at ambient temperature and each subpanel therebelow has an increasing temperature in order by a chosen difference such as five degrees. Each panel going clockwise then may have a series of subpanels in which each panel represents a temperature range of thirty degrees each, more or less, depending on the temperature difference between the subpanels and the number of subpanels that make up a complete plate. Therefore, a high temperature difference over the plurality of subpanels may be arranged by using fewer panels than in the arrangement shown in FIG. 2. As in FIG. 2, the heating elements, heat detectors, and temperature records are not shown for simplification of the drawings.

In operation of the system, each plate as shown in FIG. 2 or each subpanel of each plate as shown in FIG. 4 is provided with a heating element such that a different temperature may be maintained on each panel or each subpanel. Each temperature detecting device on each plate or each subpanel is connected with a suitable stylus-type recorder such that a temperature record may be maintained over a period of time. The period of time will depend on the type of recorder used which may be from one day to a week or longer, as desired. Since the temperature of each plate or subpanel is determined by the heating element therein, each of the plates or subpanels may be connected in parallel to a DC or AC heating unit which will provide the electrical current for each of the heaters. Once the panels have been arranged in a desired arrangement and the temperature detecting devices have been secured thereto, the panels may be lowered into a surrounding water where the panels will be left for a predetermined period of time. The panels may be removed from the water periodically to make a study thereof and also the recording charts of the stylus-type recorder may be examined to make sure that the equipment is operational. By providing a single plate with a single heating element therein or a plate having a plurality of subpanels thereon, each of which is arranged in a suitable gridwork, studies may be made of the effect of different temperatures for the control of the growth of marine animals, plants and/or other marine organisms under differeing environmental conditions. Since each of the plates is in an assembly which is in the same location within the water, the same type of marine animals and plants, etc. will be available for growth on each of the plates or subpanels. Thus an accurate study of the prevailing conditions in the water may be made.

Test made using heated panels with controlled temperature and time of application of the heat has proven that heat applied to the panels controls growth of fouling marine organism. Therefore it has been determined that heat as well as light and salinity affect the growth of fouling marine organisms.

It is well known that light and salinity affect the growth of fouling organisms. Therefore, the plates are arranged such that each plate may have the same amount of light thereon, or measured differences in light exposures, and arranged close together in the same area so that the salinity will be substantially the same about each of the plates. Each of the plates made into subpanels could be rotated 90° from that shown in the drawing, FIG. 4, so that the length of the subpanels are in the vertical position rather than horizontal, as shown. In this manner the temperature of the water from the surface downwardly will be the same on each subpanel of each plate.

The total assembly of panels can be placed in a horizontal position in the water, thereby producing differential light exposures. Other arrangements may be made wherein the plates or subpanels may be placed side-by-side in the water. The arrangement of the panels is not critical; however, to obtain a more accurate determination of the growth, the panels should be in the same general area within the water such that the environmental conditions are substantially the same on each plate or subpanel.

Separate panel or subpanel assemblies may be made of identical plates, then placed in the same general area and programmed as desired to provide different timed operation. For instance, one plate assembly may have heat applied continuously to the plates whereas other assemblies may operate to heat the panels or subpanels for different timed intervals. Thus, the best temperature range and time for the application of heat may be determined. In practice, the temperature range may be between ambient (45°–80° F.) and 160° F. for periods that may be between continuous, to a five-minute period in each four-hour period or any other desired operating conditions of temperature and time.

The above-described assemblies or plates are used in oceans or other natural bodies of water; however, the assemblies or plates may be used in the laboratory under controlled environmental conditions such as light, salinity, etc.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. A device for determining the effects of temperature with and/or without the effects of light and other environmental factors on the growth of fouling marine organisms which comprises:
   at least one metallic plate,
   at least one heating element in each plate, and
   a temperature detector secured to each plate one for each of said heating elements.

2. A device as claimed in claim 1, which includes:
   one metallic plate,
   said metallic plate has a single heating element, and
   a single temperature detector.

3. A device as claimed in claim 1 wherein:
   said plate is formed into a plurality of subpanels,
   a heating element of different resistance assembled in each of said subpanels, and
   a temperature detector secured to each of said subpanels of said plate relative to each of said heating elements.

4. A device as claimed in claim 3 in which:
   each of said subpanels is of equal width and the heating elements within each of said subpanels are equally spaced, and
   the resistance of each successive heating element in order is such that adjacent heating elements produce a desired temperature difference in which the temperature difference is uniform over the length of said plate.

5. A device as claimed in claim 2, wherein:
   a plurality of said metallic plates are formed into an assembly,
   each of said heating elements in said plurality of plates being connected in parallel to an electrical power source, and
   each of said temperature detectors is connected to separate temperature recording means.

6. A device as claimed in claim 3 wherein:
   a plurality of said heating elements are assembled into an assembly,
   each of said heating elements is connected to a temperature detector, and each of said temperature detectors is connected to separate temperature recording means.

7. A method of impeding the growth of fouling marine organisms on a surface which comprises:
applying heat to said surface from within said surface.

8. A method as claimed in claim 7, wherein:
said heat is applied for a specific time interval.

9. A method as claimed in claim 8, wherein:
said heat of a range between 45°–160° F. is applied to said surface.

10. A method as claimed in claim 8, wherein:
said heat is applied at about 120° F. for a period of 5 minutes during each successive 4-hour period.

References Cited

UNITED STATES PATENTS

| | | | |
|---|---|---|---|
| 900,929 | 10/1908 | Howe. | |
| 3,309,167 | 3/1967 | Galler | 114—222 XR |
| 632,919 | 9/1899 | Farley | 114—222 |
| 2,535,083 | 12/1950 | Martin. | |
| 2,769,334 | 11/1956 | Soehngen | 73—15 |
| 3,148,534 | 9/1964 | Benson | 73—61.2 |
| 3,198,005 | 8/1965 | Wolfson | 73—61.2 |

DAVID SCHONBERG, *Primary Examiner.*